United States Patent [19]

Gerry

[11] 4,206,737
[45] Jun. 10, 1980

[54] MODULATED IGNITION SYSTEM

[76] Inventor: Martin E. Gerry, 13452 Winthrope St., Santa Ana, Calif. 92705

[21] Appl. No.: 969,075

[22] Filed: Dec. 13, 1978

Related U.S. Application Data

[63] Continuation-in-part of Ser. No. 812,919, Jul. 5, 1977, Pat. No. 4,128,811, Ser. No. 814,206, Jul. 11, 1977, Pat. No. 4,140,947, Ser. No. 814,457, Jul. 11, 1977, Pat. No. 4,139,804, Ser. No. 816,714, Jul. 18, 1977, Pat. No. 4,144,476, Ser. No. 868,118, Jan. 9, 1978, Pat. No. 4,168,692, Ser. No. 878,792, Feb. 17, 1978, Pat. No. 4,169,445, and Ser. No. 913,437, Jun. 7, 1978.

[51] Int. Cl.² ............................................. F02P 1/00
[52] U.S. Cl. ........................ 123/148 E; 123/148 AC; 123/148 CB; 123/148 DS; 315/209 R
[58] Field of Search ..... 123/148 AC, 148 E, 148 CB, 123/148 B, 148 DS; 315/209 R

[56] References Cited

U.S. PATENT DOCUMENTS

| | | | |
|---|---|---|---|
| 4,051,828 | 10/1977 | Copic | 123/148 E |
| 4,088,107 | 5/1978 | Chateâu | 123/148 E |
| 4,140,946 | 2/1979 | Gerry | 123/148 E |
| 4,144,476 | 3/1979 | Gerry | 123/148 E |

*Primary Examiner*—Charles J. Myhre
*Assistant Examiner*—Raymond A. Nelli

[57] ABSTRACT

An AC powered ignition system employs a rectangular wave power source and a logic circuit for controlling igniter firing. Such logic circuit intermittently interrupts the flow of DC bias current in active stages of the AC power source and activates an electronic switch to charge the output winding of the AC power source and the primary winding of an ignition transformer by means of a DC source, and then discharge such windings into a capacitor at the same time as the AC power source provides its alternating current output by deactivating such electronic switch. Large transient intermodulated currents and voltages result thereby to provide high energy firing levels to igniters in a fuel burning engine. Provisions are made to include a second capacitor in series with the output and primary windings and/or a second electronic switch that prevent residual charge in the AC power source from appearing as a voltage or current during periods between igniter firing.

21 Claims, 12 Drawing Figures

MODULATED IGNITION SYSTEM

CROSS-REFERENCE TO RELATED APPLICATIONS

This application is a continuation-in-part of copending applications Ser. No. 812,919 filed July 5, 1977, now U.S. Pat. No. 4,128,811, 12/3/78, Ser. No. 814,206 filed July 11, 1977, now U.S. Pat. No. 4,140,947, 2/20/79, Ser. No. 814,457 filed July 11, 1977, now U.S. Pat. No. 4,139,804, 2/13/79, Ser. No. 816,714 filed July 18, 1977, now U.S. Pat. No. 4,144,476, 3/13/79, Ser. No. 868,118 filed Jan. 9, 1978, now U.S. Pat. No. 4,168,692, 9/25/79, Ser. No. 878,792 now U.S. Pat. No. 4,169,445, 10/2/79, filed Feb. 17, 1978, Ser. No. 913,437 filed June 7, 1978.

INCORPORATION BY REFERENCE

U.S. Pat. No. 4,122,815, owned by same applicant, is incorporated by reference for details of the ignition timing method discussed therein.

BACKGROUND OF THE INVENTION

This invention is in the field of ignition systems for fuel burning engines and more particularly in such systems wherein the igniters thereof are AC powered with superimposed transient modulation. Still more specifically, it is in an area of such ignition systems wherein the AC powering means have active signal generating stages which are controlled by logic circuits to switch the bias current in such stages on and off for each firing cycle, as well as to precharge inductive components and then discharge such components during each igniter firing cycle.

The prior art does not appear to deal with bias modulation control of ignition systems for fuel burning engines nor in suppressing residual stored energy in such systems between firing cycles.

SUMMARY OF THE INVENTION

To avoid the inefficiencies, slow time response control of transient modulated AC voltages and currents and to inhibit stored energy in an output transformer of the system from flowing in between firing cycles, a system was devised that keys or modulates DC bias currents in power generation stages, so that high level power transients will be efficiently created upon such keying or modulation without objectionable energy flowing between igniter firing cycles due to storage of residual energy in inductive means of the system.

Hence, an objective of this invention is to provide the ability to control high power output from an AC power source by keying on and off the DC bias to transistors of such power source, or to equivalents of such transistors.

Another objective of this invention is to produce high transient current and high transient induced voltage modulation patterns which are only possible when the system is switched on and off by current flow interruption of the input or bias circuits and not possible by magnetic saturation of an output transformer core which is inherently slow-acting.

A further objective of this invention is to obtain operation of the system at high efficiency, and where semiconductor components are used to maintain them cool throughout the operation period of the system, which objective is also not possible when a circuit is magnetically saturated to quench oscillation for predetermined or random periods of time.

Yet a further objective of this invention is the ability to utilize a simple output transformer with a minimum of three windings, which objective is not possible by other systems and still obtain on and off control of AC power, and additionally to utilize such magnetic cores having very high flux density characteristics so as to enable exceptionally large charges to be stored in such core and released during igniter firing cycles.

Still a further objective of this invention is to provide an ignition system which draws very low DC power from an automotive battery and yet provides high instantaneous power and energy to fire the igniters.

Yet another objective of this invention is to provide means for precharging the output winding of the transformer in the AC generator and discharging such winding during the firing cycle of each igniter.

Accordingly, the inventive ignition system comprises an AC power generation source, logic means for intermittently interrupting flow of DC biasing current in such stages, and an output transformer coupled to such stages.

The output transformer is coupled to an ignition transformer primary winding, to a capacitor and to a conventional high voltage distributor, which capacitor is used to compensate for at least a portion of the inductances of the output transformer and ignition transformer.

The capacitor is intermittently short-circuited when the AC generator is biased to its non-oscillatory state by the logic of the system, so as to store energy in the output winding of the transformer of the AC generator and also to store energy in the ignition transformer primary winding. Such stored energy is released in the capacitor when an electronic switch is biased to remove the short-circuit from across the capacitor at which time the logic means initiates oscillation of the AC power source, so that the transient created by the released stored energy intermodulates with the AC generated power during each firing cycle of the igniters.

Another capacitor of larger capacitive value than the first mentioned capacitor is in series with such first mentioned capacitor, or alternatively another electronic switch connected to the primary circuit of the AC generator is used for preventing residual energy stored in the transformer of the AC generator from flowing in the system during periods intermediate igniter firing periods.

The first mentioned capacitor is a reactance compensator and therefore performs a multiple function, including its normal capacitive function in an oscillator as well as its reactance compensation function for maximizing AC current flow in the ignition transformer primary winding.

The output transformer of the AC generator, has a three winding structure, one of which is used for feedback of induced AC from the primary winding of such output transformer to the inputs of the power generation stages, and the keyed DC bias is applied through this feedback winding by means of one of several different types of logic circuits.

Such output transformer employs a laminated core such as may be used in AC power or audio power transformers, in relays or the like, generally made of materials such as cold rolled steel, relay steel, soft iron, silicon steel or alloys thereof, which core can help produce the largest magnetic flux density possible without having too much of remnant flux in the core that inhibits the generation of high voltages in windings thereon. The higher voltages thus produced due to the high flux storage and rapid release from such core materials will result in more intense and greater number of arcs during igniter firing as compared with the more expensive cores which do not provide such advantages.

It should be noted that although discussion of the AC power generation means is in terms of a rectangular wave output pattern, it should be understood that AC units providing triangular, saw-tooth, sinusoidal or other waveforms may likewise be used in this system.

DETAILED DESCRIPTION

Figure 1:
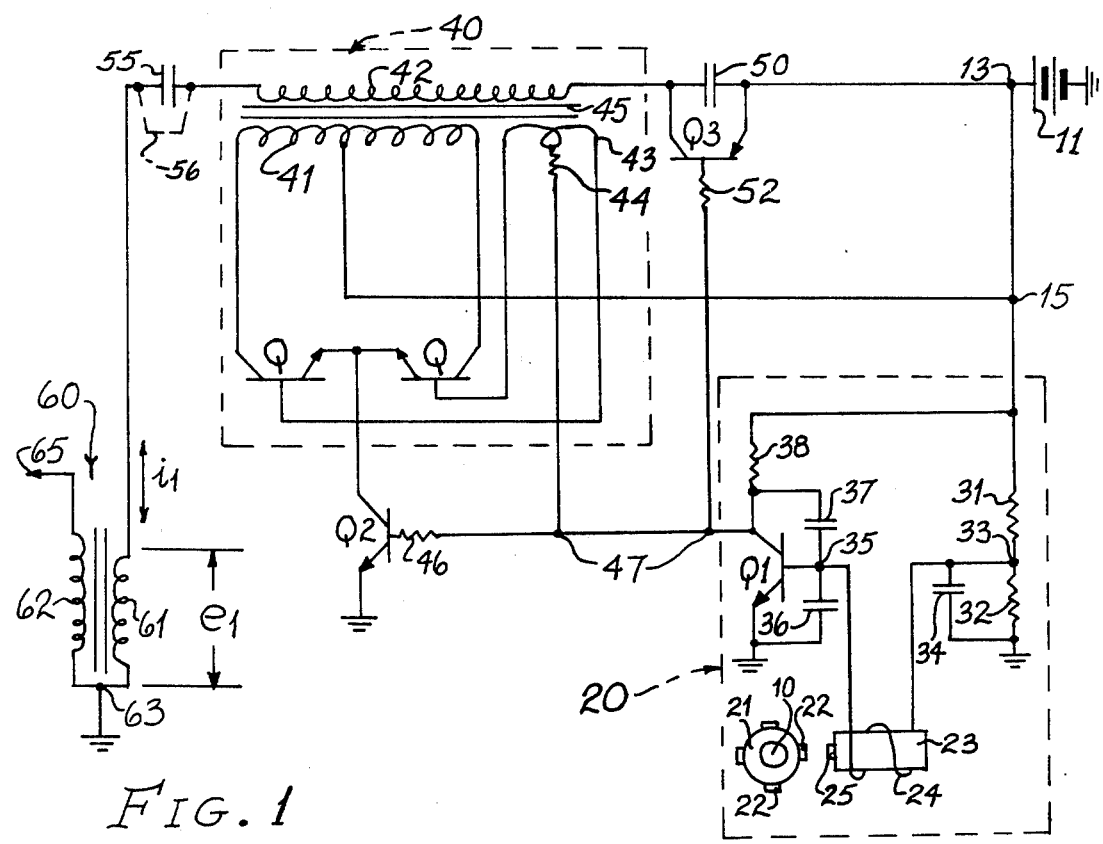
FIG. 1 is an electrical schematic of the ignition system according to the invention, employing magnetically initiated logic means.

Referring to FIG. 1, the inventive system shown therein is used to provide a transient to intermodulate with another transient generated by AC power to fire igniters of a fuel burning engine. Logic control circuits which include timers are provided for intermittently keying or modulating DC bias so as to switch the AC power unit on and off, and to precharge the ignition transformer primary winding and the output winding of an output transformer of the AC power unit, thereby providing high transient current and voltage waves to fire igniters.

A transistor power generator 40 includes an output transformer having a center-tapped primary winding 41, a secondary or output winding 42, and a center-tapped tertiary or feedback winding 43, all wound on a laminated core 45 made of cold rolled steel, relay steel, soft iron, silicon steel or mixtures or alloys thereof. The basic repetition rate of the generally rectangular waves provided by generator 40 are in the order of about 2 kilohertz, although higher or lower frequency rates can be used. It should be understood that a generator such as 40 may also be used wherein the waveform output is triangular, saw-tooth, sinusoidal or even random wave shapes.

Figure 10:
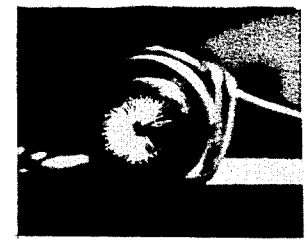
FIG. 10 is a photograph of the base of an igniter showing the firing arcs provided by the system.

The use of the types of magnetic materials for core 45, as above stated, makes all the difference between a system that produces the type of arcs as seen in FIG. 10, or merely a few sparks of relatively low intensity. An alternative to the use of a transformer wound on the indicated core material 45, when a conventional transformer made from more expensive but less effective cores are used, is to use a simple solenoid winding of about 75 turns of number 18 to 22 gage wire, to correspond with the wire size of such conventional transformer, wound on a one inch square core of the material indicated for core 45 and such device should have a closed magnetic path. Such device is inserted in series with primary 61 and will accumulate charge rapidly and deliver such charge to the system to provide the desired arcs.

Winding 41 is connected at its outer ends respectively to the collectors of a pair of transistors Q, in this illustration of the NPN type, the emitters of which are connected to the collector of transistor Q2, which is also an NPN type, and the emitter of Q2 is at ground potential. It will be shown below that in another mode of operation the need for Q2 is eliminated and consequently when not used the base thereof is disconnected from junction terminal 47 and the emitters of transistors Q are grounded.

It will be understood throughout this specification that the conventional ground symbol indicates the negative terminal of battery 11 as well as being a common return path for either AC or DC currents flowing in the system.

The center tap of winding 41 is connected at positive DC battery potential at 15 and to junction 13. Junctions 13 and 15 are therefore both at positive DC potential since junction 13 is connected to the positive terminal of battery 11.

Winding 43 of the output transformer has its outer ends connected each to one base respectively of transistors Q for feeding induced voltage from primary 41 to such bases so as to maintain transistors Q in oscillation mode when positive DC bias is applied to the center tap of winding 43 through resistor 44 by logic means 20, hereinbelow discussed.

Type 2N3055H type transistor Q1 and type 2N6284 Darlington circuit power transistors Q have been found to give excellent and reliable results. Likewise types 2N6284, 2N6547 or Motorola's types MJ 10009 or MJ 10014 have provided good results as the Q2 transistor. In this configuration transistor Q3 is required of the PNP type and Motorola's type 2N6287 supplied good results with high reliability.

It should be noted that capacitor 50 connected in series with winding 42 and in parallel with Q3 provides a dual function in this system. It firstly acts as a capacitor in a typical transient reliant system, which capacitor is by-passed during charging mode of the ignition transformer primary winding and herein also winding 42, and secondly when the proper capacitive value is selected, it acts as a means for maximizing AC current flow from source 40 circulating in the primary circuit which consists of winding 41 and the Q transistors, wherein maximum current is transferred to the circuit which includes output winding 42. Maximum AC current will flow when the capacitive value of capacitor 50 is such so as to compensate for the inductive reactances of windings 42 and 61, including the reactance reflected into winding 61 from winding 62 when an igniter is firing, to the principal generated frequency component of the AC unit.

Logic means 20, has a timing component consisting of reluctance wheel 21 having regularly spaced ribs 22 at the wheel periphery, wherein wheel 21 and its ribs 22 are made of a suitable magnetic material and wherein such wheel is driven by distributor shaft 10 which is common to any automotive engine. Such timing component employs permanent magnet 23 having a sensor winding 24 thereon. Magnet 23 has pole piece 25 at one end, so that when shaft 10 is driven by the engine, ribs 22 will interrupt magnetic flux lines between such ribs 22 and pole piece 25, and induce a voltage in winding 24 to create the timing gate.

The magnetic timing component may be designed with respect to the orientation of the north and south magnetic poles of magnet 23 as well as with respect to the direction of the turns of wire comprising winding 24, so as to provide either a leading negative or leading positive going pulse as an output of winding 24 when one of ribs 22 is driven past pole piece 25. The leading negative pulse design was adopted herein since this is conventional in the automotive industry, and accordingly the components of logic means 20 are tailored to recognize such timer pulse. The voltage output in the form of such pulse is fed to transistor switch Q1, to the base thereof at 35 to enable Q1 to provide the igniter firing timing gate at its collector.

Logic means 20 also comprises a voltage divider consisting of resistors 31 and 32 having a capacitor 34 shunting resistor 32. Such voltage divider is connected to positive DC power at 13 and 15. Resistors 31 and 32 are chosen so that a positive DC potential of about 1.2 volts appears at junction 33 to which one end of winding 24 is connected. Such logic circuit herein utilizes an NPN type transistor switch Q1, the collector of which is connected through resistor 38 to junction 15 so as to provide DC power to switch Q1. The other side of winding 24 is connected to the base of Q1, and such base has capacitor 36 connected between it and the emitter of Q1, which emitter is at ground potential. The function of capacitors 34 and 36 are to filter out and reject AC components riding on the gate pulse and initiated by winding 24 due to switching action of timer reluctor wheel 21 when shaft 10 drives the reluctor wheel past pole piece 25. If desired, an additional capacitor 37 may be connected between junction 35 and the collector of Q1 for effecting additional rejection of such timer generated AC components. However, in this system, it may be an advantage to pass such timer generated AC components as they serve to modulate the gate or firing pulse, provided at junction terminals 47, thereby adding more firing energy by increasing the alternating current output from source 40. Junction terminals 47 is the point in the system which will change in its potential to enable switching control of the alternating current source 40, residual energy inhibit switch Q2 and charging of inductors 42 and 61 by control of switch Q3. It is of course to be noted that it would be a simple matter to utilize PNP types as the Q transistors with appropriate changes in the rest of the circuit comprising logic circuit 20, Q2 and Q3.

Operatively, when shaft 10 is not being rotated or driven by the engine, no voltage is provided by winding 24 across junctions 33 and 35. Under such condition, the base of Q1 will be at a positive potential, sufficient to maintain Q1 in its ON mode, so that junction terminals 47 will be at ground potential. In this case, DC current will flow through winding 24 to maintain the base of Q1 at a positive potential, thereby maintaining Q1 in its ON state, in which case junction terminals 47 will be at ground potential thus causing the base of Q2 to be at ground potential as well as the bases of both Q transistors, thereby preventing source 40 from oscillating and Q2 from conducting.

When shaft 10 is driven, a pulse having a negative going excursion is induced in winding 24 at the time when one of ribs 22 is driven past pole piece 25, providing such negative going pulse to the base of Q1 at 35 and turning off Q1, thereby causing junction terminals 47 to be at positive potential, and under these conditions, turning on oscillator 40 by virtue of positive DC being applied to the bases of transistors Q through the center-tap of winding 43, as well as by turning on switch Q2 by virtue of such same DC positive bias being applied to its base through resistor 46. The following table shows the switching logic of the circuits of FIG. 1:

| Rib 22 | Potential at 35 | Q1 State | Potential at 47 | Q3 State | Q2 and Q States | Windings 42 and 61 |
|---|---|---|---|---|---|---|
| not driven opposite pole piece 25 | positive | ON | ground | ON | OFF | charge |
| driven past pole piece 25 | negative | OFF | positive | OFF | ON | discharge |

Since Q1 is generally a silicon device, it requires a base potential between 0.6 and 0.8 volts to mantain it in conductive state, and hence the positive 1.2 volts provided between junction 33 and ground, even considering the voltage drop in winding 24, will still maintain adequate voltage level at 35 within the stated limits for minimum sustaining voltage, so that Q1 will be in the ON state when shaft 10 is at standstill as well as when shaft 10 is driven but when ribs 22 are not opposite pole piece 25. In the ON state of Q1, junction terminals 47 will be at ground potential thereby biasing the base of Q2 and the bases of the Q transistors to cause them to be non-conductive, or in the OFF states.

The divider network consisting of resistors 31 and 32 is chosen so that the voltage at junction 33 with be 1/10 th the voltage of battery 11. Hence if the battery or power source charging such battery is defective so that only 8 volts is provided by the battery, there will still be 0.8 volts at junction 33 which will be sufficient to maintain switching action of Q1 and operate logic means 20. Additionally, the manner in which winding 24 is connected in the logic means and the large capacitance of capacitor 34, permitted at its shown location, act to provide a stable source of input voltage to winding 24, thereby providing a very reliable switching circuit.

When saft 10 is driven and one of ribs 22 is driven past pole piece 25, a negative going pulse will be induced in winding 24 which is between 1.5 and 2 volts in amplitude, thereby overcoming the positive bias of the base of Q1 and driving such base negative thereby cutting off current conduction between the collector and emitter of Q1, so that Q1 in switching to its OFF state, will cause junction terminals 47 to be raised to a positive potential so as to turn on the Q transistors of power source 40 and also turn on Q2. The manner in which the Q transistors of source 40 provide switching action at particular repetition rates is well known in the art. For instance, the theory of such type of oscillator is discussed at pages 45 and 46 including schematic 22 therein of Bulletin TC-101B printed by Arnold Engineering Company of Marengo, Ill., and is on record in the search room of the United States Patent and Trademark Office since same was provided from such purpose by applicant in connection with other matters. It should be noted however, that applicant has succeeded in simplifying and making such oscillator in the form of generator 40 in FIG. 1 or generator 40a in FIG. 2 hereof, more reliable.

When power source 40 is turned on during each firing cycle, that is, each time one of ribs 22 is driven past pole piece 25, such source stays on for the duration when any portion of rib 22 is opposite any portion of pole piece 25, providing the firing gate or firing period at 47 to enable firing of an igniter in an engine. Power source 40 will keep on generating rectangular waves during such firing gate by virtue of Q1 being in its OFF state and consequently Q2 and the Q transistors being biased so as to cause Q2 to conduct during such firing gate period and the Q transistors to oscillate. By virtue of rotation of wheel 21, when pole piece 25 is between ribs 22, no firing gate is provided because there is absent the required negative going pulse as input at 35, so that Q1 is again biased sufficiently positive to switch it to its ON state thereby turning off Q2 and the Q transistors and turning on Q3.

The transformer of source 40 has a secondary winding 42 which provides energy to an external load such as capacitor 50 and primary winding 61 of ignition transformer 60, as well as being an enabling means to initiate conduction in Q3 when jumper wire 56 is removed and capacitor 55 is in series with winding 42, by virtue of the negative going peaks of the waveform generated by generator 40 during each firing cycle.

A capacitor at 50 is connected between junction 13 and winding 42. Capacitor 50 is the means for enabling current, and hence power, to be transferred in sufficient magnitude from primary circuit winding 41 through secondary winding 42 to the load, in this case to transformer primary 61. Without such capacitor current $i_1$ would not be present in sufficient quantity in winding 61 and consequently voltage $e_1$ across primary 61 would be inadequate. Considering that the circuit comprising winding 42, primary 61 including inductive reactance reflected by secondary 62 when under igniter firing, the capacitive reactance presented by capacitor 59 enables compensation of these inductive reactances resulting in an increased current $i_1$. The resonance principle cannot be used in its entirety to explain the phenomena involving the capacitor's compensation function, since resonance generally involves a single frequency and consequently unique reactance value, and in this system multiple frequencies are generated by power source 40 which involve a like number of different reactances. In any event, such capacitor 50 is selected by trying various values of capacitors until current $i_1$ is at a maximum. Current $i_1$ may be conveniently measured and observed by using a one-ohm high power resistor in series with primary 61 and measuring the voltage across such resistor by means of an accurately calibrated high frequency oscilloscope. Typical values for capacitor 50, depending on repetition rate of source 40, will be in the order of 0.2 to 1.0 microfarads.

Ignition transformer 60 was selected to have a turns ratio of 100, somewhat higher than stock automobile transformer turns ratios, since this will provide a greater voltage induced in primary 61 and transferred to secondary 62 to either an igniter or to a switching distributor or the like connected to high voltage cable at 65. It should be noted that this system lends itself to making a common ground connection at 63 of the primary 61 and the secondary 62 of transformer 60, so that the voltages and currents in transformers 60 will have a common reference point rather than a swinging impedance, absent such common junction ground connection. Such ground common connection can only be made since switch Q3 was located at a low impedance location in the system rather than close to primary winding 61. In the latter instance, the voltages developed between collector and emitter of such switch would be in the order of 500 to 600 volts during the non-conductive state thereof and although there are semiconductor switches with such ratings, it has been found that such switches will last only a brief period of time before failing, whereas connecting Q3 as shown only a peak-to-peak value of 50 volts was measured during the OFF state of Q3 between its collector and emitter.

Bias resistor 52 of switch Q3 is selected of sufficient ohmic value to limit the base current to a safe level within the rating limits of that transistor, and a resistor value is used that permits just enough base current to flow so as to enable Q3 to perform its switching function rapidly. Providing too much base current in Q3 by having too low an ohmic value for resistor 52 will slow down switching time of Q3 from its ON to its OFF state, and will tend to defeat the major purpose and use of this switch.

Figure 9:
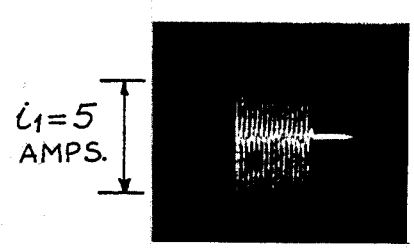
FIG. 9 is a photographed oscilloscopic current pattern of the ignition transformer primary wherein the energy content between igniter firing periods shown in FIG. 6 have been eliminated in a different way than the method used to result in FIG. 7.

When jumper wire 56 is removed so that capacitor 55 is in series with windings 42 and 61, no DC current can flow through windings 42 and 61 during the ON mode of Q3 to charge windings 42 and 61 therewith. However the switching action of Q3 produces a transient current both when Q3 is switched ON or when Q3 is switched OFF. The transient current produced when Q3 is switched ON provides some initial charge to windings 42 and 61 as well as to capacitor 55 to precharge same therewith. When Q3 is switched OFF, the precharged windings 42 and 61 and capacitor 55 will cause their charges to combine with the AC provided by generator 40. Since at this time Q2 need not be in circuit as discussed above, but can be if desired, the positive DC bias provided to transistors Q through resistor 44 will turn on generator 40, so that generator 40 waveform output will intermodulate with the charges released by windings 42 and 61 and by capacitor 55 through capacitor 50. The fact that such system is operational is evidenced by the oscilloscopic current pattern in FIG. 9, showing a peak-to-peak current of 5 amperes through primary winding 61.

In a high power system such as illustrated, separation of firing waveforms will not be possible by virtue of the fact that energy generated by source 40 and residual in its transformer winding, will tend to cause the current $i_1$ to continue to flow after the Q transistors are biased to their OFF states. Consequently, in the system when jumper wire 56 is connected to short-circuit capacitor 55, switch Q2 is used to simultaneously cut off emitter current, and in FIG. 2 to cut off collector current, when transistors Q are biased to their OFF states, thereby preventing accumulation of added charge in winding 41 at that time and hence such added charge is not available to be transferred to winding 42, so that current $i_1$ will not exhibit energy transfer between igniter firing cycles. An example of such effectiveness of Q2, and Q4 in FIG. 2 circuit, may be seen from examination of FIG. 6 which shows energy present due to attempted pre-charge of windings 42 and 61 with DC power between igniter firing periods, whereas with Q2 in circuit, or Q4 in the circuit of FIG. 2, the elimination of such energy between igniter firings is seen in the FIG. 7 waveform, as well as in its corresponding voltage waveform of FIG. 8. If such in-between igniter firing energy levels become too high then pre-ignition firing can result in the next-in-sequence to fire igniter, and the use of Q2 in FIG. 1 or Q4 in FIG. 2 circuits prevents such occurrance.

Another feature of the inventive system, including of course the variations of such system as discussed below in conjunction with the other system figures herein, is the quiescent state of power source 40 for about 25% of the system on-time. Inasmuch as Darlington circuits are used for the Q s, high AC currents circulate in their collector circuits in the ON modes of such Q s. Such high currents will contribute to high induced voltages in winding 42, and would normally require large heat sinks to dissipate the heat generated thereby. Since in this power generator, each of the Q's is in its ON state only half the time of each cyclic excursion of the AC current produced therein, and since each igniter firing period is less than one-half its non-firing period in time duration, triggering bias winding 43 in order to turn the Q s on and off, will permit the transistors to be maintained at relatively low operating temperatures because each of the Q s will in effect have a duty cycle of less than 25%. Further, switching such power source 40 to its ON mode will create a transient voltage at the beginning of each firing cycle which will be greater in amplitude than the voltage normally deliverable by such source 40, absent this type of switching.

Accordingly, in its charging mode, when junction terminals 47 are at ground potential and jumper wire 56 is connected across capacitor 55, Q3 will by-pass capacitor 50, will permit DC from battery 11 to flow through and charge output winding 42 and primary winding 61. During such charging mode, the base of Q2 and the bases of transistors Q being at ground potential, these transistors will not conduct and power source 40 will not oscillate. Conversely, during firing mode, junction terminals 47 will be at positive DC potential and Q3 will not conduct but Q2 and transistors Q will have base current flowing therein and hence will conduct providing an AC voltage across winding 42 and current $i_1$ flowing through windings 42 and 61 and through capacitor 50 to provide voltage $e_1$ induced in primary winding 61. Current $i_1$ can be considered as having two components, one due to the AC from source 40 and the other due to the pre-charged windings 42 and 61, now discharged through the entire circuit consisting of winding 61, winding 42, capacitor 50 and through battery 11 to ground. Such two components intermodulate to produce the current waveform shown in FIGS. 6 or 7, and the voltage waveform shown in FIG. 8.

Another convenient method of elimination of residual energy seen between firing cycles, is the use of capacitor 55, enabled by removal of jumper wire 56. In such case, it is optional whether switch Q2 is retained in circuit. However, assuming Q2 is electrically removed from the circuit by removing transistor Q2 from its socket and connecting the collector to the emitter thereof at the socket terminals, it may be seen from FIG. 9 that current $i_1$ will flow with absence of energy between firing cycles. Although the current amplitude is somewhat higher with the use of capacitor 55, which capacitor has a value of about 10 times the capacitance value of capacitor 50, higher cross-modulation frequency components are lost and as a result the effective duty cycle of the system is reduced in time per igniter firing. Accordingly, an actual firing of an igniter will produce a lesser quantity of arcs as compared with the configuration where capacitor 55 is not in circuit and Q2 is in circuit.

Figure 2:
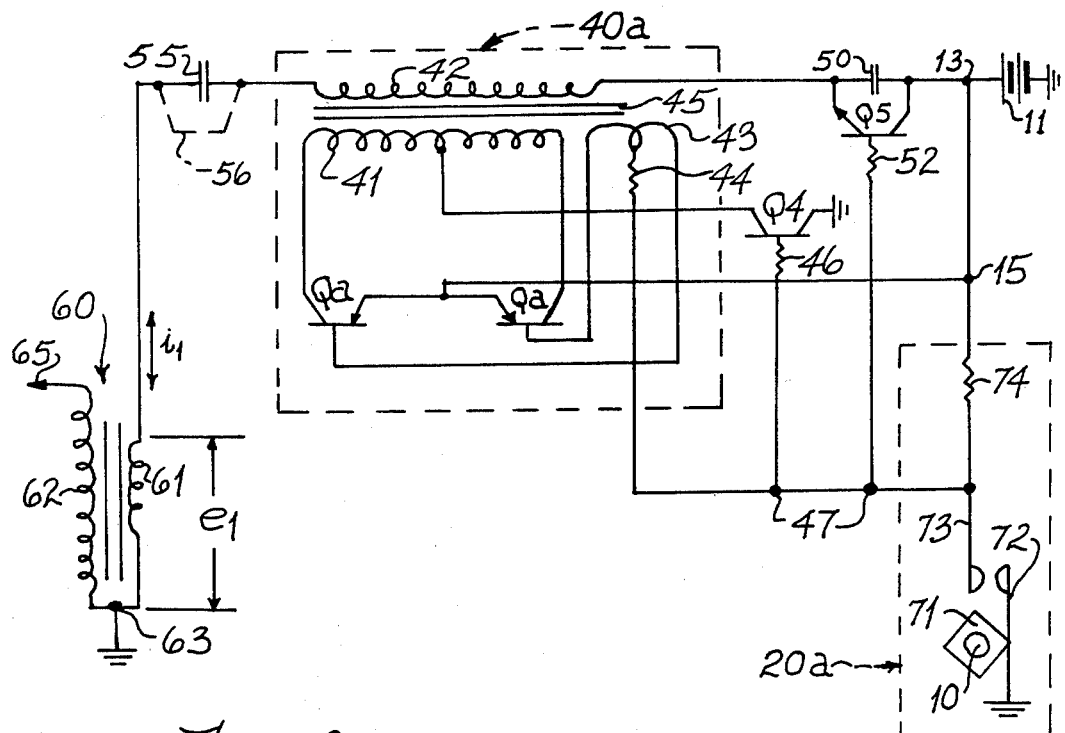
FIG. 2 is an electrical schematic of the same system as in FIG. 1 except for the use of complementary transistors in the AC power unit and the use of a different logic means.

Referring to FIG. 2, the system herein performs in identical manner as in the case of FIG. 1, except that AC source 40a having PNP transistors Qa are used, Q4 replaces Q2 of FIG. 1, and Q5 replaces Q3 of FIG. 1.

Except for the use of Q4, which is located in the collector circuit of source 40a which illustrates the equivalence with the analogous control transistor switch used in circuit 40 of FIG. 1 in the emitter circuit, the same functions are performed by FIG. 2 system as discussed in connection with the FIG. 1 system, the only difference being that logic means 20a replaces the magnetic pulse actuated logic of circuit 20 of FIG. 1.

Logic means 20a employs cam actuated contactors, cam 71 being driven by distributor shaft 10 to causes contactors 72 and 73 to be opened and closed in accordance with the cam action. Contactor 72 is at ground potential and contactor 73 is connected through resistor 74 to junction 15 so as to obtain positive DC potential thereat. Contactor 73 is connected to junction terminals 47 to provide the modes of operation at this control point as already discussed in connection with FIG. 1, except that the FIG. 1 discussion was couched in terms of a power source to provide the alternating current which has NPN transistors and consequently required its complementary PNP type of transistor to perform the function which Q5 herein performs, and also except that control function of Q4 was performed in the emitter circuit of the FIG. 1 configuration instead of the collector circuit as herein.

Consequently, when contactors 72 and 73 are opened by the high portion of cam 71 being in cooperation with contactor 72, the potential at 47 will be positive and Q4 and the Qa transistors will be in the non-conductive states, whereas Q5 will be in its conductive state, and windings 42 and 61 will be charged by passing DC from battery 11 therethrough, at which time capacitor 50 will be by-passed by virtue of conductive state of Q5. When contactors 72 and 73 are closed, junction terminals 47 will be at ground potential and Q4 and the Qa transistors will be in their ON states to cause circuit 40a to oscillate and at that time Q5 will be in its OFF state to remove the effective short circuit from across capacitor 50 and thereby permit discharge current from windings 42 and 61 to flow through capacitor 50 and battery 11 to ground so as to provide the same modulation of the alternating current produced by circuit 40a, as obtained with the FIG. 1 configuration. Here too, the use of capacitor 55 instead of Q4 provides the identical results as discussed in connection with such capacitor usage in the FIG. 1 configuration, all other functions being identical to those discussed in conjunction with FIG. 1 configuration. The logic of the system of FIG. 2 may be summarized by the following table showing the switching logic:

| Contactors 72-73 | Potential at 47 | Q5 State | Windings 42 and 61 | Q4 and Qa States |
|---|---|---|---|---|
| open | positive | ON | charge | OFF |
| closed | ground | OFF | discharge | ON |

Figure 2A:
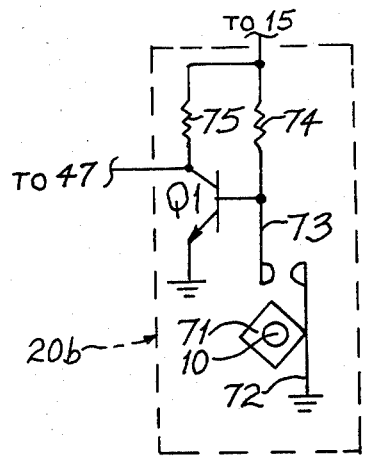
FIG. 2a is substantially the same as FIG. 2 schematic except for the use of an additional transistor switch in the logic means thereof.

Referring to FIG. 2a, the system of either FIGS. 1 or 2 can be connected to logic means 20b to perform the functions as described in connection with FIG. 1. Logic means 20b is different from logic means 20a only with respect to addition of NPN switching transistor Q1 the base of which is connected to contactor 73, its collector being connected through resistor 75 to junction terminal 15 and the emitter thereof being at ground potential. The collector of Q1 is therefore the point connected to junctions terminals 47 and is the point in the system where switching functions of the system are controlled. The only advantage of logic circuit 20b over circuit 20a is that of the amplifying characteristics of such circuit. By connecting terminals 47 to the collector of Q1 a larger gate pulse will be provided which will result in current tails superimposed on the $i_1$ current waveform to result in increased current flow in primary winding 61. Hence the logic table shown in connection with FIG. 2, is equally applicable to the system when used with the logic means 20b.

Figure 3A:
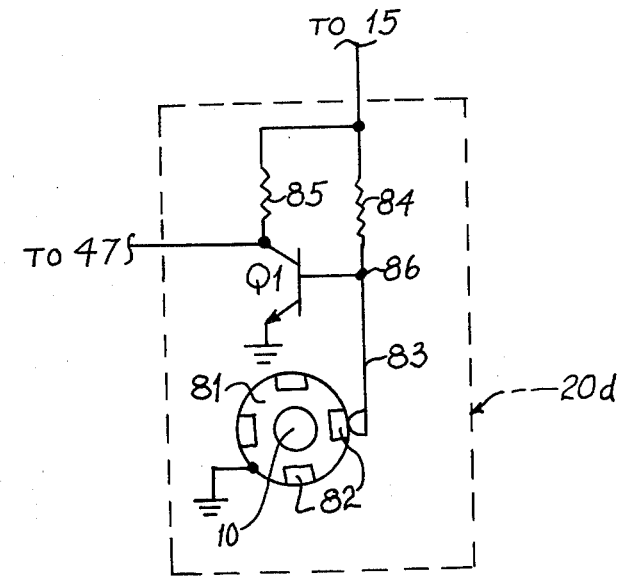
FIG. 3a is substantially the same as FIG. 3 schematic except for the use of an additional transistor switch in the logic means thereof.
Figure 3:
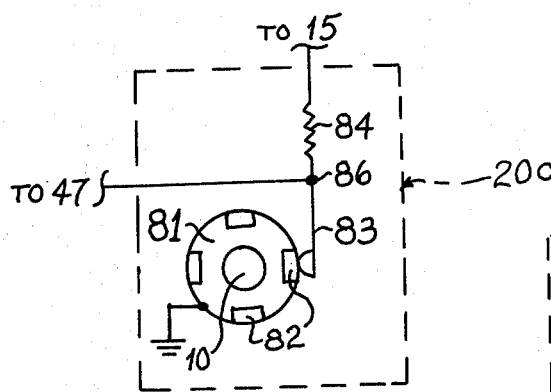
FIG. 3 is an electrical schematic of a different logic means usable with the system of FIG. 2.

Referring to FIG. 3, logic means 20c used therein provides the same functions as provided by logic means 20a of FIG. 2 and hence the logic table for FIG. 2 is equally applicable to summarize the logic of FIG. 3 with components 81-83 substituting for components 71-73. Logic means 20c employs an electrically conductive disk 81 attached to and driven by shaft 10 of the engine. The shaft being at ground potential will electrically ground disk 81. Disk 81 has a plural number of electrically insulative members 82 regularly spaced at the periphery of the disk within the disk confines. The number of members 82 will be equal to the number of igniter circuits as provided by a conventional high voltage distributor. Here, four igniter circuits and corresponding four igniters, one for each of the four engine cylinders, is assumed. Contactor 83 is connected to junction 86 and such contactor is in cooperation with the periphery of the disk. Resistor 84 is connected between junction 86 and junction 15 to provide positive DC potential at junction 86. Consequently, when the electrically conductive portion of disk 81 is in cooperation with contactor 83, junction terminals 47 will be at ground potential causing Q3 of FIG. 1 to conduct and charging windings 42 and 61. When member 82 is in cooperation with contactor 83, junctions 86 and 47 will be at positive potential thereby biasing Q3 to its nonconductive state and removing a virtual short-circuit from across capacitor 50 and causing discharge of the charged windings 42 and 61 through capacitor 50. In the case of the use of FIG. 2 configuration with logic circuit 20c, the results are opposite, that is when contactor 83 is in cooperation with the electrically conductive portion of disk 81 and junctions 86 and 47 are at ground potential, Q5 being an NPN type transistor, discharge of previously charged windings 42 and 61 through capacitor 50 will take place, and of course the charging of windings 42 and 61 will occur herein when contactor 83 is in cooperation with insulative member 82 causing junctions 86 and 47 to be at positive potential.

The logic discussed in connection with FIG. 3 is equally applicable to FIG. 3a as well as the logic circuit 20a of FIG. 2 or logic circuit 20b of FIG. 2a, except that in circuits 20a and 20b contactors 72-73 are used in lieu of disk 81 with its insulative members 82 and in lieu of contactor 83.

Referring to FIG. 3a, logic circuit 20d is substantially similar in providing the functions as performed by circuit 20c of FIG. 3, except that in circuit 20d, Q1 switch is added by connecting the base thereof to junction 86 and by connecting the collector through resistor 85 to junction 15 so as to obtain DC positive potential thereat. The emitter of Q1 is at ground potential. The collector of Q1 will therefore be at the same potential as discussed in connection with logic circuit 20b of FIG. 2a, such collector being connected to junction terminal 47. Since the logic performed by circuit 20d is the same as in the case of circuits 20b or 20c, the foregoing discussion is applicable to FIG. 3a logic circuit when used to replace the logic circuit 20 of FIG. 1 or the logic circuit 20a of FIG. 2.

Figure 4:
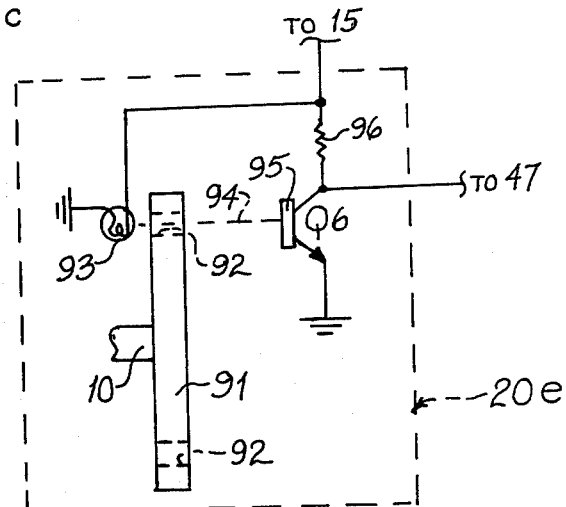
FIG. 4 schematic represents a system substantially the same as the system of FIG. 1 except for employing optical triggering of the logic means thereof.

Referring to FIG. 4, logic means 20e has the optical type timing mechanism, which connects to terminal junctions 47 to either of the structures of FIG. 1 or FIG. 2 by a connection made from the collector of optically sensitive semiconductor switch Q6 to junction terminals 47.

Circuit 20e comprises a disk 91 driven by distributor shaft 10. Disk 91 has apertures 92 regularly spaced in the disk at the periphery thereof. Powered illumination means 93 is provided at one face of disk 91 for optically intermittently illuminating base 95 of Q6 by means of light beam 94 passing through such apertures 92 to turn Q6 on each time light beam 94 impinges on base 95 and thereby causes the collector of Q6 to take on ground potential by virtue of collector current flowing in Q6. When light beam 94 is blocked by the opaque portion of disk 91, Q6 is in its nonconducting state and no collector current flows, and consequently the potential at either end of release 96 is the same, namely positive DC potential. Hence, when Q6 is in its ON state, junction terminals 47 will be at ground potential maintaining Q3 of FIG. 1 in its ON state and the Q transistors of FIG. 1 in their OFF states thereby charging windings 42 and 61. On the other hand, when Q6 is in its OFF state, junction terminals 47 will be at positive DC potential switching Q3 to its OFF state and the Q transistors to their oscillatory states, thereby discharging windings 42 and 61 through capacitor 50 at the same time as AC power is delivered by circuit 40 to intermodulate with the discharge current. The following logic table is applicable to show the logic of FIG. 4 switching function when FIG. 4 circuit is used with the circuit of FIG. 1:

| Light Beam 94 | Q6 State | Potential at 47 | Q3 State | Windings 42 and 61 | Q2 and Q States |
|---|---|---|---|---|---|
| passes through 92 | ON | ground | ON | charge | OFF |
| blocked by disk 91 | OFF | positive | OFF | discharge | ON |

Inasmuch as in FIG. 2, switch Q5 is analogous to switch Q3 of FIG. 1, but is complementary thereto, the functions will be exactly opposite when circuit 20e is used with the FIG. 2 configuration to those shown in the foregoing logic table for use with the FIG. 1 configuration. That is, all functions shown when light beam 94 is blocked occur as shown when the light beam passes through apertures 92, and vice-versa.

Figure 5:
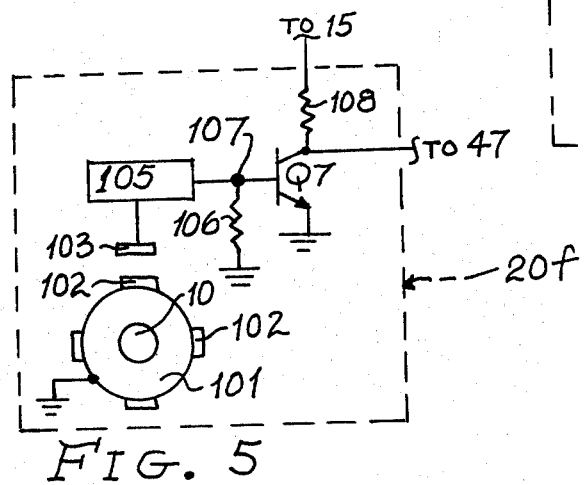
FIG. 5 is a system substantially the same as the system of FIG. 1 except for employing angular modulation triggering of the logic means thereof.

Referring to FIG. 5, the system illustrated is identical to the system as discussed in connection with FIGS. 1 or 2, except that logic means 20 of FIG. 1 and logic means 20a of FIG. 2 is replaced by logic means 20f. Such logic means 20f employs an angular modulated oscillator wherein such oscillator 105 is modulated by virtue of a variable capacitor being driven by distributor shaft 10. Such capacitor comprises a rotatable plate 101 having protrusions 102 regularly spaced at the periphery of plate 101 and having a single fixed plate 103 connected to oscillator 105. Plate 101 is at ground potential since it is attached to shaft 10 which is grounded. Oscillator 101 provides a positive going signal output imposed upon junction 107 of the logic circuit 20f whenever a protrusion 102 is driven past fixed plate 103. More details concerning this modulation method is available in U.S. Pat. No. 4,122,815 which was incorporated by reference.

Logic circuit 20f has a bias resistor 106 connected between base of transistor Q7 at 107 and ground so as to maintain the base at ground potential until such time as a positive signal from oscillator 101 drives the base sufficiently positive to cause base current to flow and hence to cause collector current to flow and Q7 to conduct. The collector of Q7 has resistor 108 connected between it and junction 15 which is at positive DC potential. The emitter of Q7 is at ground potential, so that when junction 107 is biased positive due to a signal at 107 from oscillator 105, base current and hence collector current flows and places the Q7 collector and junction terminals 47 at ground potential, thereby causing Q3 to conduct and the Q transistors and Q2 to remain in their OFF states, and windings 42 and 61 to be charged. When no signal from oscillator 105 is present at junction 107, the base of Q7 will be at ground potential and no base current or collector current will flow to maintain Q7 in its OFF state, thereby causing the collector of Q7 and junction terminals 47 to be at positive DC potential and Q3 to be switched to its OFF state and the Q transistors to their oscillatory state and Q2 to its conductive state. The following table expresses the logic performed by the FIG. 5 configuration when used in conjunction with FIG. 1 circuit:

| Oscillator 105 | Potential at 107 | State of Q7 | Potential at 47 | State of Q3 | Windings 42 and 61 | Q2 and Q States |
|---|---|---|---|---|---|---|
| angularly modulated | positive | ON | ground | ON | charge | OFF |
| not modulated | ground | OFF | positive | OFF | discharge | ON |

Inasmuch as in FIG. 2, switch Q5 is analogous to switch Q3 of FIG. 1, but is of complementary type semiconductor, the functions will be exactly opposite when circuit 20f is used with FIG. 2 configuration to those shown in the foregoing logic table for the FIG. 1 configuration. That is all functions shown when oscillator 105 is angularly modulated will be represented in such logic table by the functions opposite the condition for the not modulated case, and vice-versa.

Referring to FIGS. 6 through 10, photographic results of the system performance in terms of waveforms of current $i_1$ through primary 61 and voltage $e_1$ across such primary 61, constitute the oscilloscopic current and voltage patterns, and include a photograph of the arcs fired by the system. In conjunction with these photographs, primary current $i_1$ was measured using a calibrated 50 megahertz oscilloscope made by Hewlett-Packard Company, by measuring the voltage across a high power one-ohm resistor inserted in series with primary 61. The voltage was measured across such primary using the same calibrated oscilloscope. FIG. 2 and FIG. 2a configurations were used for these tests. A four port conventional distributor was driven by means of its shaft 10, to provide timing by the cam actuated contactor pair in such distributor as shown in FIGS. 2 or 2a.

Figures 7, 8:
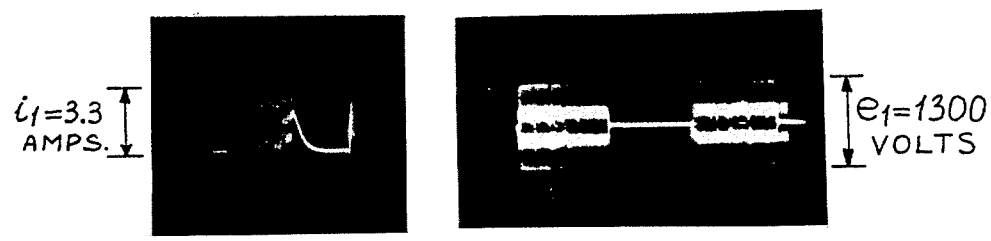
FIG. 7 is a photographed oscilloscope calibrated pattern of the current in the ignition transformer primary winding showing the actual peak-to-peak current swings, under conditions when objectionable energy content between igniter firings shown in FIG. 6 have been eliminated.
FIG. 8 is a photographed oscilloscopic pattern of the voltage across the ignition transformer primary under conditions of the current pattern of FIG. 7.

The amplitudes of the voltages $e_1$ measured were substantially of the same peak-to-peak value of 1300 volts, and only the photograph of $e_1$ corresponding to the $i_1$ condition of FIG. 7 is illustrated in FIG. 8 as exemplary.

Figure 6:
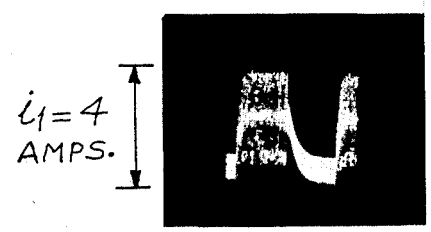
FIG. 6 is a photographed oscilloscopic calibrated pattern of the current through the ignition transformer primary winding showing the actual peak-to-peak current swings.

FIG. 6 illustrates the actual current $i_1$ under condition when Q2 of FIG. 1 or Q4 of FIG. 2 are not in circuit, showing the energy stored in the transformer of circuits 40 or 40a being released between igniter firing periods as well as during igniter firings. Such condition is eliminated by the use of Q2 or Q4 in their respective circuits as seen from $i_1$ current in FIG. 7 which does not have the stored energy released between igniter firing periods, and likewise the corresponding voltage $e_1$ shown in FIG. 8 is free from such energy flow between igniter firing periods. FIG. 9 shows the condition wherein neither Q2 nor Q4 are in their respective circuits and jumper wire 56 is removed so that capacitor 55 is added to the series circuit that includes the ignition transformer primary winding, and it may be seen from current waveform therein that no energy is released during periods between igniter firings. It has been pointed out previously that the amplitudes of currents $i_1$ are not the only consideration, and notwithstanding the larger current obtained under conditions of FIG. 9, the conditions giving rise to FIG. 7 current, though lower in amplitude, provide better firing or igniter arc performance than those of FIG. 9.

It should also be noted, that FIG. 6 condition represents usable circuit performance since the energy between firing cycles was insufficient to cause pre-ignition. A simple test was made by rotating distributor shaft 10 by hand to note that there is sufficient time or angle spacing between successive igniter positions along the locus of the distributor rotor when no firing occurs which is indicative that no energy transfer will actually occur under FIG. 6 condition in between the desired firing periods for the igniters.

FIG. 10 is an actual photograph of the firing arcs experienced under the FIG. 7 current and FIG. 8 voltage condition. There is no appreciable difference in the arc intensity when examined under the FIG. 6 condition. However, under the FIG. 9 condition, the arcs were lesser in quantity than seen in FIG. 10, but each individual arc thereof appears to be slightly thicker than the arcs comprising FIG. 10 though lesser in number than the quantity of arcs of FIG. 10. It would therefore appear that the number of arcs correlate with the number of cycles one can count in the current waves, and consequently the number of cycles in the current wave of FIG. 6 or FIG. 7 is substantially greater than the number of cycles in the current wave of FIG. 9. Hence, the fact that the current wave of FIG. 7 for example only has an amplitude of 3.3 amperes whereas the current wave of FIG. 9 has an amplitude of 5 amperes is not conclusive of a better system represented by FIG. 9, since the effective duty cycle, that is the portion of the firing time when arcs occur is far greater in the FIG. 7 situation than in the FIG. 9 situation, and the FIG. 7 situation will probably yield a greater total firing energy per firing cycle than the FIG. 9 situation.

It should also be noted that when observing the arcs, there appeared to be a very high increase in arc velocity as interpreted from the audible arc firing noise of the FIG. 6 or FIG. 7 current situation, compared with the lower noise level in the FIG. 9 current situation which also may have bearing upon the energy levels of the respective arcs produced.

What is claimed is:

1. An ignition system comprising the combination of:
    a power source having output means for providing alternating current;
    a DC source connected to and intermittently feeding said power source;
    a capacitor connected between said output means and DC source; and
    first switching means, in parallel with said capacitor, for charging said output means during a first mode of operation and for discharging said output means during a second mode of operation of the system.

2. The invention as stated in claim 1, wherein said power source has a primary circuit comprising a transformer having a primary winding and electronic switches connected to said primary winding, and including second switching means connected to said primary circuit for suppressing charge residual in said transformer between firing periods of the system.

3. The invention as stated in claim 1, including capacitive means, in series with said output means and in series with the parallel combination of said capacitor and first switching means, for inhibiting DC current from flowing through said output means during said first mode and for enabling transient current to flow through said output means during said second mode.

4. The invention as stated in claim 1, including logic means, coupled to said power source and first switching means, for biasing said power source to its quiescent state and said first switching means to its conductive state during said first mode, and for biasing said power source to its oscillatory state and said first switching means to its quiescent state during said second mode.

5. The invention as stated in claim 1, wherein said power source comprises a transformer having a laminated magnetizable core with windings thereon, said core being of a material selected from the group consisting of soft iron, silicon steel, relay steel, cold rolled steel or alloys thereof.

6. The invention as stated in claim 1, including an ignition transformer having a primary inductor and a secondary inductor, said primary inductor being in series with said output means and being charged during said first mode and discharged during said second mode, said primary and secondary inductors having a common junction which is at ground potential.

7. The invention as stated in claim 2, including logic means, coupled to said power source and to said first and second switching means, for biasing said power source and second switching means to their quiescent states and the first switching means to its conductive state during said first mode, and for biasing said power source to its oscillatory state and said second switching means to its conductive state and said first switching means to its quiescent state during said second mode.

8. The invention as stated in claim 2, wherein said power source comprises a transformer having a laminated magnetizable core with windings thereon, said core being of a material selected from the group consisting of soft iron, silicon steel, relay steel, cold rolled steel or alloys thereof.

9. The invention as stated in claim 2, including an ignition transformer having a primary inductor and a secondary inductor, said primary inductor being in series with said output means and being charged during said first mode and discharged during said second mode, said primary and secondary inductors having a common junction which is at ground potential.

10. The invention as stated in claim 2, wherein the second switching means is connected to said primary winding of said primary circuit.

11. The invention as stated in claim 2, wherein the second switching means is connected to said electronic switches of said primary circuit.

12. The invention as stated in claim 3, including logic means, coupled to said power source and first switching means, for biasing said power source to its quiescent state and said first switching means to its conductive state during said first mode, and for biasing said power source to its oscillatory state and said first switching means to its quiescent state during said second mode.

13. The invention as stated in claim 3, wherein said power source comprises a transformer having a laminated magnetizable core with windings thereon, said core being of a material selected from the group consisting of soft iron, silicon steel, relay steel, cold rolled steel or alloys thereof.

14. The invention as stated in claim 3, including an ignition transformer having a primary inductor and a secondary inductor, said primary inductor being in series with said output means and being charged during said first mode and discharged during said second mode, said primary and secondary inductors having a common junction which is at ground potential.

15. The invention as stated in claim 4, including an ignition transformer having a primary inductor and a secondary inductor, said primary inductor being in series with said output means and being charged during said first mode and discharged during said second mode, said primary and secondary inductors having a common junction which is at ground potential.

16. The invention as stated in claim 4, wherein said logic means includes timing means for effecting said first mode in alternation with said second mode.

17. The invention as stated in claim 16, wherein said timing means comprises a pulse generating magnetic timer.

18. The invention as stated in claim 16, wherein said timing means comprises an electrically conductive disk having a plural number of electrically insulative members regularly spaced at the periphery of the disk within the confines of said disk, and a contactor in cooperation with said periphery.

19. The invention as stated in claim 16, wherein said timing means comprises a disk having apertures regularly spaced in the disk at the periphery of said disk and illumination means at one face of said disk for optically illuminating said logic means through said apertures.

20. The invention as stated in claim 16, wherein said timing means comprises cam actuated contactors.

21. The invention as stated in claim 16, wherein said timing means comprises a modulated oscillator.

* * * * *